United States Patent
Matsuyama

(10) Patent No.: US 9,596,400 B2
(45) Date of Patent: Mar. 14, 2017

(54) IMAGE PICKUP APPARATUS THAT PERIODICALLY CHANGES EXPOSURE CONDITION, A METHOD OF CONTROLLING IMAGE PICKUP APPARATUS, AND STORAGE MEDIUM

(71) Applicant: CANON KABUSHIKI KAISHA, Tokyo (JP)

(72) Inventor: Ichiro Matsuyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/019,632

(22) Filed: Sep. 6, 2013

(65) Prior Publication Data

US 2014/0063330 A1    Mar. 6, 2014

(30) Foreign Application Priority Data

Sep. 6, 2012  (JP) ................. 2012-196076

(51) Int. Cl.
  *H04N 5/225* (2006.01)
  *H04N 5/232* (2006.01)
  *H04N 5/235* (2006.01)

(52) U.S. Cl.
  CPC ....... *H04N 5/23212* (2013.01); *H04N 5/2353* (2013.01); *H04N 5/2356* (2013.01); *H04N 5/2355* (2013.01); *H04N 5/23258* (2013.01)

(58) Field of Classification Search
  CPC ............. H04N 5/2355; H04N 5/23212; G06T 2207/20208; G06T 5/009; G06T 5/008; G06T 5/007

(Continued)

(56) References Cited

U.S. PATENT DOCUMENTS 7,916,209 B2  3/2011 Asoma
8,208,034 B2  6/2012 Kanehiro
(Continued)

FOREIGN PATENT DOCUMENTS

CN  1467991 A   1/2004
CN  101272458 A   9/2008
(Continued)

OTHER PUBLICATIONS

Korean Office Action issued in Korean counterpart application No. KR10-2013-0103702, dated Sep. 1, 2015.
(Continued)

*Primary Examiner* — Jason Flohre
*Assistant Examiner* — Dwight C Tejano
(74) *Attorney, Agent, or Firm* — Rossi, Kimms & McDowell LLP

(57) ABSTRACT

An image pickup apparatus capable of performing proper image evaluation in photographing a moving image by changing the exposure condition. An image pickup unit picks up an image of an object and a driving unit drives a focus lens in an optical axis direction. A control circuit controls a focus state of the object by causing the driving unit to move the focus lens in the optical axis direction. A focus evaluation value is acquired from each image. The control circuit causes the image pickup unit to pick up images of a multistage exposure image group by changing exposure time, selects an image according to exposure time, updates a direction of driving the focus lens using the focus evaluation value acquired from the selected image, and causes the driving unit to move the focus lens in the updated driving direction.

8 Claims, 8 Drawing Sheets

(58) Field of Classification Search
USPC .................................................. 348/345–357
See application file for complete search history.

(56) References Cited

U.S. PATENT DOCUMENTS

| | | | |
|---|---|---|---|
| 8,368,771 B2 | 2/2013 | Kino | |
| 2002/0180881 A1* | 12/2002 | Kondoh et al. | 348/345 |
| 2004/0145673 A1* | 7/2004 | Washisu | 348/364 |
| 2006/0250515 A1* | 11/2006 | Koseki et al. | 348/362 |
| 2008/0253758 A1* | 10/2008 | Yap et al. | 396/234 |
| 2009/0147125 A1 | 6/2009 | Muraki et al. | |
| 2009/0231445 A1* | 9/2009 | Kanehiro | H04N 5/23248 348/208.2 |
| 2013/0120615 A1* | 5/2013 | Hirooka | H04N 5/2355 348/239 |
| 2013/0286254 A1* | 10/2013 | Watanabe | 348/239 |

FOREIGN PATENT DOCUMENTS

| | | |
|---|---|---|
| JP | 2007-215073 A | 8/2007 |
| JP | 2009-141538 A | 6/2009 |
| JP | 2009225072 A | 10/2009 |
| JP | 2011151795 A | 8/2011 |

OTHER PUBLICATIONS

Office Action issued in Chinese Application No. CN201310404117.1 dated Jun. 3, 2016. English translation provided.

\* cited by examiner

IMAGE PICKUP APPARATUS THAT PERIODICALLY CHANGES EXPOSURE CONDITION, A METHOD OF CONTROLLING IMAGE PICKUP APPARATUS, AND STORAGE MEDIUM

BACKGROUND OF THE INVENTION

Field of the Invention

The present invention relates to an image pickup apparatus, such as a digital camera, that performs contrast detection focus control, a method of controlling the image pickup apparatus, and a storage medium.

Description of the Related Art

When photographing a scene in the open air using a digital camera, there is a case where a luminance range of the scene is wider than a photographable luminance range. In this case, the gradation information of an object outside the photographable luminance range cannot be recorded, and hence blown-out highlights or blocked-up shadows are formed in the photographed image. For example, in the case of photographing a person in the open air on a clear day, if the exposure is adjusted for the person, there can be a case where the photographed image suffers from blown-out highlights in the sky or clouds as the background or blocked-up shadows in the leafy shade of a tree as the background. Therefore, the impression given when the photographed image is viewed is sometimes different from that given when the scene is actually viewed.

As one of techniques for solving the above-mentioned problem, an HDR (High Dynamic Range) process is known. The HDR process basically includes a dynamic range-increasing process and a gradation compression process.

The dynamic range-increasing process increases the photographable dynamic range and records gradation information of a luminance range in which blown-out highlights or blocked-up shadows occurred. According to a general method thereof, a group (multistage exposure image group) of images photographed by changing the exposure for the same contents are synthesized (hereinafter, an image generated by this dynamic range-increasing process is referred to as an HDR image).

On the other hand, the gradation compression process is image processing for reproducing an HDR image having a wide dynamic range using a display/output device with a narrow dynamic range, in a preferable manner, and uses a method of compressing amplitude or the like, for low-frequency components of the luminance of the HDR image. By executing the HDR process described above, it is possible to display or print out a preferable image in which the blown-out highlights/blocked-up shadows are reduced (Japanese Patent Laid-Open Publication No. 2007-215073).

On the other hand, during photographing of a moving image, many of the digital cameras perform AF (auto focus) control by evaluating the contrast of a photographed image. However, in a frame image picked up over a long exposure time period, i.e. at a slow shutter speed, the image can be out-of-focus e.g. due to a camera shake, causing high-frequency components to be lost, and hence it is not possible to always evaluate the contrast with accuracy.

To solve this problem, there has been proposed a technique which sequentially performs image pickup over a short exposure time period and over a long exposure time period in an alternating manner, and uses a frame picked up over the long exposure time period for display and recording, and a frame picked up over the short exposure time period for image evaluation e.g. for AF (Japanese Patent Laid-Open Publication No. 2009-141538).

However, the above-mentioned Japanese Patent Laid-Open Publication No. 2007-215073 and Japanese Patent Laid-Open Publication No. 2009-141538 have no description about image evaluation using images picked up under respective exposure conditions, which images are picked up by changing the exposure condition for image synthesis in moving image photographing for the purpose of generating an HDR moving image having a wide dynamic range.

SUMMARY OF THE INVENTION

The present invention provides an image pickup apparatus capable of performing proper image evaluation during photographing of a moving image by changing the exposure condition, and a method of controlling the image pickup apparatus.

In a first aspect of the present invention, there is provided an image pickup apparatus comprising an image pickup unit configured to pick up an image of an object, a driving unit configured to drive a focus lens in a direction of an optical axis, a control unit configured to control a focus state of an object whose image is to be picked up by causing the driving unit to move the focus lens in the direction of the optical axis, and an evaluation value acquisition unit configured to acquire a focus evaluation value from an image output from the image pickup unit, wherein the control unit is operable to cause the image pickup unit to pick up images of a multistage exposure image group by changing an exposure time period, select an image from the multistage exposure image group based on each exposure time period of the images of the multistage exposure image group, update a direction of driving the focus lens using the focus evaluation value acquired from the selected image, and cause the driving unit to move the focus lens in the updated driving direction.

In a second aspect of the present invention, there is provided an image pickup apparatus comprising an image pickup unit configured to pick up an image of an object, a motion detecting unit configured to detect an amount of motion of the image pickup unit, a driving unit configured to drive a focus lens in a direction of an optical axis, a control unit configured to control a focus state of an object whose image is to be picked up by causing the driving unit to move a focus lens in the direction of the optical axis, and an evaluation value acquisition unit configured to acquire a focus evaluation value from an image output from the image pickup unit, wherein the control unit is configured to cause the image pickup unit to pick up images of a multistage exposure image group by periodically changing an exposure time period, update the direction of driving the focus lens using the focus evaluation value acquired from an image of the multistage exposure image group, for which the amount of motion acquired by the motion detecting unit during exposure is small relative to the amount of motion acquired by the motion detecting unit for other images of the multistage exposure group, and cause the driving unit to move the focus lens in the updated driving direction.

In a third aspect of the present invention, there is provided an image pickup apparatus that picks up images of a multistage exposure image group by changing an exposure time period, comprising an image pickup unit configured to pick up an image of an object, an evaluation value acquisition unit configured to acquire an evaluation value from an image output from the image pickup unit, and an evaluation unit configured to evaluate the object using the evaluation value acquired from at least one of an image which is the shortest in exposure time period, in the multistage exposure image group obtained by the image pickup unit, and an image which is shorter in exposure time period than a reference value.

In a fourth aspect of the present invention, there is provided an image pickup apparatus having a normal moving image-photographing mode and a high-dynamic range moving image-photographing mode for imaging a group of multistage exposure images which are different in exposure time period, comprising an image pickup unit configured to pick up an image of an object, an evaluation unit configured to calculate an evaluation value from an image output from the image pickup unit, and evaluate the object by performing a comparison between the evaluation values of a plurality of images, and a synthesis unit configured to synthesize the multistage exposure image group to thereby generate a high-dynamic range image having a wide dynamic range, wherein the evaluation unit is configured to perform the comparison by normalizing each evaluation value by brightness of an image from which the evaluation value is acquired, when the imaging apparatus is set to the high-dynamic range moving image-photographing mode.

In a fifth aspect of the present invention, there is provided a method of controlling an image pickup apparatus including an image pickup unit configured to pick up an image of an object, and a driving unit configured to drive a focus lens in a direction of an optical axis, the method comprising controlling a focus state of an object whose image is to be picked up by causing the driving unit to move a focus lens in the direction of the optical axis, and acquiring a focus evaluation value from an image output from the image pickup unit, wherein said controlling includes causing the image pickup unit to pick up images of a multistage exposure image group by changing an exposure time period, selecting an image from the multistage exposure image group based on each exposure time period of the images of the multistage exposure image group, updating a direction of driving the focus lens using the focus evaluation value acquired from the selected image, and causing the driving unit to move the focus lens in the updated driving direction.

In a sixth aspect of the present invention, there is provided a method of controlling an image pickup apparatus including an image pickup unit configured to pick up an image of an object, and a driving unit configured to drive a focus lens in a direction of an optical axis, comprising detecting an amount of motion of the image pickup unit, controlling a focus state of an object whose image is to be picked up by causing the driving unit to move a focus lens in the direction of the optical axis, and acquiring a focus evaluation value from an image output from the image pickup unit, wherein said controlling includes causing the image pickup unit to pick up images of a multistage exposure image group by periodically changing an exposure time period, updating a direction of driving the focus lens using the focus evaluation value acquired from an image of the multistage exposure image group, for which the amount of motion acquired by said detecting the amount of motion during exposure of that image is small relative to the amount of motion acquired by said detecting for other images of the multistage exposure image group, and causing the driving unit to move the focus lens in the updated driving direction.

In a seventh aspect of the present invention, there is provided a method of controlling an image pickup apparatus that picks up images of a multistage exposure image group by changing an exposure time period, comprising acquiring an evaluation value from an image output from an image pickup unit that picks up an image of an object, and evaluating the object using the evaluation value acquired from at least one of an image which is the shortest in exposure time period, and an image which has an exposure time period that is shorter than a reference value, in the multistage exposure image group obtained by the image pickup unit.

In an eighth aspect of the present invention, there is provided a method of controlling an image pickup apparatus having a normal moving image-photographing mode and a high-dynamic range moving image-photographing mode for photographing a group of multistage exposure images which have different exposure time periods, comprising calculating an evaluation value from an image output from an image pickup unit that picks up an image of an object, and evaluating the object by performing a comparison between the evaluation values of a plurality of images, and synthesizing the multistage exposure image group to thereby generate a high-dynamic range image having a wide dynamic range, wherein when the image pickup apparatus is set to the high-dynamic range moving image-photographing mode, the comparison to evaluate the object is performed by normalizing each evaluation value using the brightness of the image from which the evaluation value is acquired.

In a ninth aspect of the present invention, there is provided a non-transitory computer-readable storage medium storing a control program for causing a computer to execute a method of controlling a method of controlling an image pickup apparatus including an image pickup unit configured to pick up an image of an object, and a driving unit configured to drive a focus lens in a direction of an optical axis, wherein the method comprises controlling a focus state of an object whose image is to be picked up by causing the driving unit to move a focus lens in the direction of the optical axis, and acquiring a focus evaluation value from an image output from the image pickup unit, wherein said controlling includes causing the image pickup unit to pick up images of a multistage exposure image group by changing an exposure time period, selecting an image from the multistage exposure image group based on each exposure time period of the images of the multistage exposure image group, updating a direction of driving the focus lens using the focus evaluation value acquired from the selected image, and causing the driving unit to move the focus lens in the updated driving direction.

In a tenth aspect of the present invention, there is provided a non-transitory computer-readable storage medium storing a control program for causing a computer to execute a method of controlling an image pickup apparatus including an image pickup unit configured to pick up an image of an object, and a driving unit configured to drive a focus lens in a direction of an optical axis, wherein the method comprises detecting an amount of motion of the image pickup unit, controlling a focus state of an object whose image is to be picked up by causing the driving unit to move a focus lens in the direction of the optical axis, and acquiring a focus evaluation value from an image output from the image pickup unit, wherein said controlling includes causing the image pickup unit to pick up images of a multistage exposure image group by periodically changing an exposure time period, updating a direction of driving the focus lens using the focus evaluation value acquired from an image of the multistage exposure image group, for which an amount of motion acquired by said detecting the amount of motion during exposure of that image is small relative to the amount of motion acquired by said detecting for other images of the multistage exposure image group, and causing the driving unit to move the focus lens in the updated driving direction.

In an eleventh aspect of the present invention, there is provided a non-transitory computer-readable storage medium storing a control program for causing a computer to execute a method of controlling an image pickup apparatus that picks up images of a multistage exposure image group by changing an exposure time period, wherein the method comprises acquiring an evaluation value from an image output from an image pickup unit that picks up an image of an object, and evaluating the object using the evaluation value acquired from at least one of an image which is the shortest in exposure time period, and an image which has a exposure time period that is shorter than a reference value, in the multistage exposure image group obtained by the image pickup unit.

In a twelfth aspect of the present invention, there is provided a non-transitory computer-readable storage medium storing a control program for causing a computer to execute a method of controlling an image pickup apparatus having a normal moving image-photographing mode and a high-dynamic range moving image-photographing mode for photographing a group of multistage exposure images which have different exposure time periods, wherein the method comprises acquiring an evaluation value from an image output from an image pickup unit that picks up an image of an object, calculating an evaluation value from an image output from an image pickup unit that picks up an image of an object, and evaluating the object by performing a comparison between the evaluation values of a plurality of images, and synthesizing the multistage exposure image group to thereby generate a high-dynamic range image having a wide dynamic range, wherein when the image pickup apparatus is set to the high-dynamic range moving image-photographing mode, the comparison to evaluate the object is performed by normalizing each evaluation value using the brightness of the image from which the evaluation value is acquired.

According to the present invention, when a moving image is photographed by changing the exposure condition, it is possible to perform proper image evaluation.

Further features of the present invention will become apparent from the following description of embodiments with reference to the attached drawings.

DESCRIPTION OF THE EMBODIMENTS

Figure 1:
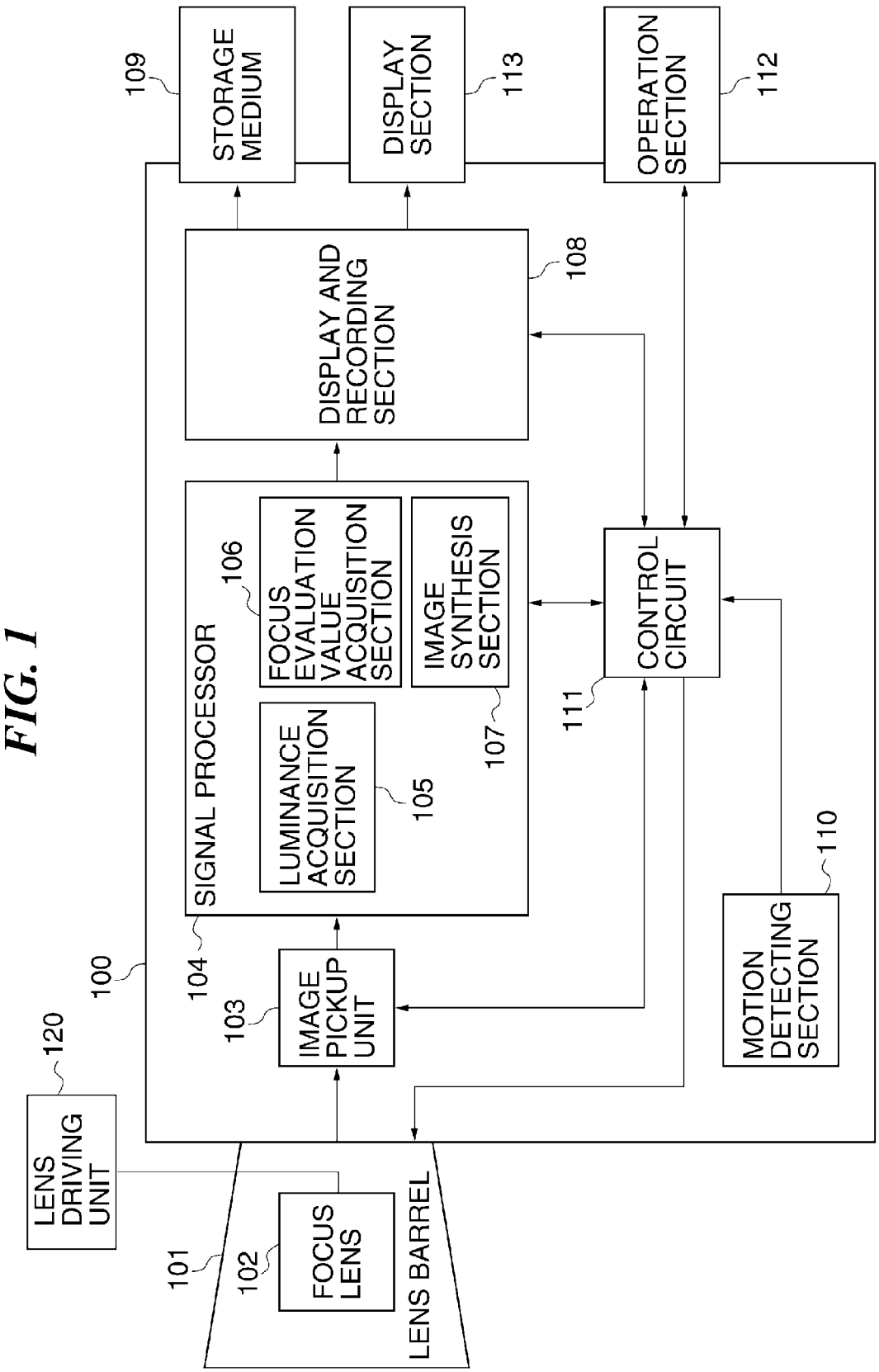
FIG. 1 is a block diagram of a digital camera as an image pickup apparatus according to a first embodiment of the present invention.

The present invention will now be described in detail below with reference to the accompanying drawings showing embodiments thereof. First, a description will be given of an image pickup apparatus according to a first embodiment of the present invention that acquires an image evaluation value when picking up a plurality of images by changing the exposure condition to generate an HDR moving image from the thus photographed images.

To photograph a group of images which are different in exposure, it is necessary to change at least one of an exposure time period, an aperture, an ND (neutral density) filter, and a gain applied to an image signal. However, it is difficult to accurately control the aperture and the ND filter at high speed matching the frame rate (e.g. 30 fps or 60 fps) of a moving image.

Further, as the gain applied to the image signal increases, the S/N ratio of the image signal is lowered, which results in noise superimposed on the image. From the above, for the HDR process for a moving image, a promising choice is to photograph a group of images different in exposure by changing the exposure time period. However, if the above-mentioned degradation of image quality and the like are to be allowed, image pickup may be performed in which the exposure condition is periodically changed by changing one of the exposure time period (electric charge accumulation time period), an F value (aperture and ND filter), and the gain applied to an image signal (ISO sensitivity).

A frame picked up over a long exposure time period is largely affected by camera shake and object motion blur, which sometimes makes it impossible to perform image evaluation with accuracy. It can be envisaged to perform image evaluation using only a frame picked up over a short exposure time period as disclosed in the above-mentioned Japanese Patent Laid-Open Publication No. 2009-141538. In this case, however, the frame picked up over a long exposure time period is not used for image evaluation, and hence the sampling rate of image evaluation is lowered, and for example, in acquiring a focusing evaluation value, a focusing operation is delayed.

In the case where only the frame picked up over a short exposure time period is used for image evaluation, it can be envisaged to prevent the sampling rate from being lowered by switching a sensor driving method to pixel addition or pixel thinning and thereby reading an image signal in a short time period, at the cost of lowering of image quality. However, the frame picked up over a short exposure time period is used for the HDR process as well, and hence the low image quality due to pixel addition or pixel thinning makes a harmful effect on the image quality of an image used for display and recording. Therefore, it is preferable to avoid the change of the sensor driving method.

To prevent the above-mentioned problem, in the present embodiment, an image to be subjected to image evaluation is selected according to photographing conditions.

FIG. 1 is a block diagram of a digital camera as the image pickup apparatus according to the first embodiment.

As shown in FIG. 1, the digital camera according to the present embodiment is provided with a lens barrel 101 disposed at a front side of a camera main unit 100. The lens barrel 101 includes a zoom lens group, a zoom mechanism, a diaphragm, an ND filter, a focus lens 102, a lens driving unit 120 for moving the focus lens 102 in a direction of an optical axis, and so forth. The focus lens 102 is moved by the lens driving unit 120 in the direction of the optical axis to thereby adjust the focus state of an object whose image is to be picked up.

The camera main unit 100 includes an image pickup unit 103, a signal processor 104, a display and recording section 108, a display section 113, an operation section 112, a storage medium 109, a motion detecting section 110, a control circuit 111, and so forth. Further, the signal processor 104 includes a luminance acquisition section 105, a focus evaluation value acquisition section 106, and an image synthesis section 107.

The image pickup unit 103 comprises an image pickup device, a sample and hold circuit (S/H circuit), and a preprocess circuit, and picks up an image of an object according to a designated exposure time period. The storage medium 109 is implemented e.g. by a flash memory, the motion detecting section 110 is implemented e.g. by a gyro sensor, the operation section 112 is implemented e.g. by a touch panel, and the display section 113 is implemented e.g. by a LCD (liquid crystal display). The control circuit 111 controls the overall operation of the digital camera.

An object light received through an optical system of the lens barrel 101 has a light amount adjusted by the diaphragm and the ND filter. In the image pickup unit 103, the object light forms an image on a light receiving surface of the image pickup device, and is converted to a video signal charge by photoelectric conversion. The video signal charge is accumulated according to the designated exposure time period.

The video signal output from the image pickup device is subjected to sample and hold processing by the sample and hold circuit, and is thereafter supplied to the preprocess circuit, where the video signal is converted from analog to digital after applying a gain according to AGC (auto gain control) processing. The resulting digital video signal is supplied to the signal processor 104. The signal processor 104 performs evaluation, correction, processing, etc. on the video signal based on instructions from the control circuit 111, and outputs the corrected and processed video signal to the display and recording section 108.

The display and recording section 108 displays the input video signal on the display section 113, and records the same in the storage medium 109 after executing intra-frame coding or inter-frame coding on the video signal, based on instructions from the control circuit 111. Further, the display and recording section 108 may covert the video signal to a predetermined signal format, and then output the resulting video signal to an external device.

The motion detecting section 110 detects an amount of motion of the camera main unit 100, and transmits the detected amount of motion to the control circuit 111.

The operation section 112 transmits instructions made by a user to the control circuit 111. The control circuit 111 controls the overall operation of the digital camera according to the instructions made by the user, which are transmitted from the operation section 112. In the present embodiment, using the operation section 112, it is possible to select from at least two photographing modes: a normal moving image-photographing mode for photographing and recording a normal moving image, and an HDR moving image-photographing mode for photographing a moving image of an HDR image by periodically differentiating the exposure.

The luminance acquisition section 105 acquires a luminance evaluation value of a video signal. In the present embodiment, the luminance acquisition section 105 acquires a luminance distribution as the luminance evaluation value. This is a histogram generated by counting all pixels of the video signal on a luminance-by-luminance basis, and the control circuit 111 evaluates based on the luminance distribution whether or not the current exposure is appropriate.

Further, based on a result of the evaluation, the control circuit 111 calculates exposure parameters (exposure conditions), such as the exposure time period of the image pickup unit 103, the aperture value, the gain, and the ND filter, and instructs the image pickup unit 103 and the lens barrel 101 to be configured according to the calculates exposure parameters, to thereby obtain appropriate exposure for an object whose image is to be picked up.

The focus evaluation value acquisition section 106 acquires an evaluation value which evaluates contrast of a video signal. The focus adjustment according to the contrast detection method is performed such that a degree of sharpness of an object image formed by the lens barrel 101 is determined by evaluating a video signal according to a predetermined function, and the position of the focus lens 102 on the optical axis is adjusted such that the degree of sharpness takes an extreme value. As the predetermined function for evaluation, there may used one which adds up the absolute values of respective differences in luminance signal between adjacent pixels within a focus detection area, and one which adds up the squares of respective differences in luminance signal between adjacent pixels within a focus detection area.

The focus evaluation value acquisition section 106 transmits a result of the evaluation of the focus state performed using such a detection method to the control circuit 111 as a focus evaluation value. The control circuit 111 calculates a driving amount of the focus lens 102 based on the focus evaluation value received from the focus evaluation value acquisition section 106, and instructs the lens driving unit 120 of the lens barrel 101 to drive the focus lens 102 by the calculated driving amount.

The image synthesis section 107 performs position adjustment for a group of N-stage exposure images which are sequentially photographed by changing the exposure in N stages, so as to correct, with reference to one frame included in the image group, a shift of the other frames from the one frame, caused by a camera shake or a motion of an object.

Further, the image synthesis section 107 synthesizes the group of images of N frames to thereby obtain one frame of an HDR image having an increased dynamic range. Further, the image synthesis section 107 performs processing for compressing the gradation to a narrow dynamic range which can be output by the display and recording section 108 that displays and records the image, and outputs the obtained image to the display and recording section 108.

Note that in the present embodiment, an HDR image is generated by weighted addition of an image group of N frames. However, the synthesis processing for generating an HDR image is not limited to this, and it is to be understood that the synthesis processing includes one for generating an HDR image by selectively outputting images to be used simply based on a signal from each area of one image.

Further, although the frame rate between image pickup and output (display and recording) may be set to N:1, in the present embodiment, the range of N frames having captured respective photographed images for use in synthesis is shifted by one frame each time to synthesize the N-stage exposure image group, whereby the frame rate is set to 1:1.

Next, a description will be given of an example of exposure control in the HDR moving image photographing mode with reference to FIGS. 2A to 2G.

Figure 2A:
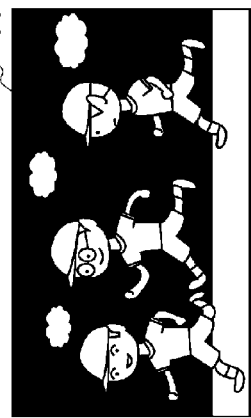
FIGS. 2A to 2G are diagrams useful in explaining an example of an HDR process and exposure control, performed by the digital camera.
Figure 2D:
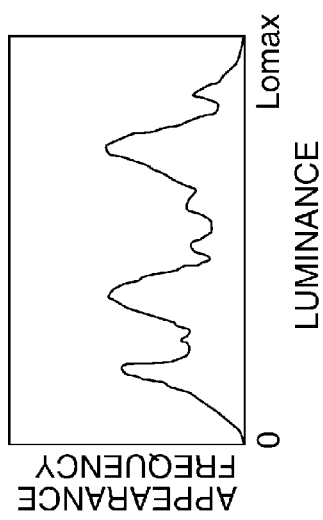
Figure 2B:
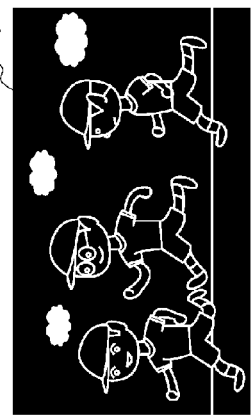
Figure 2E:
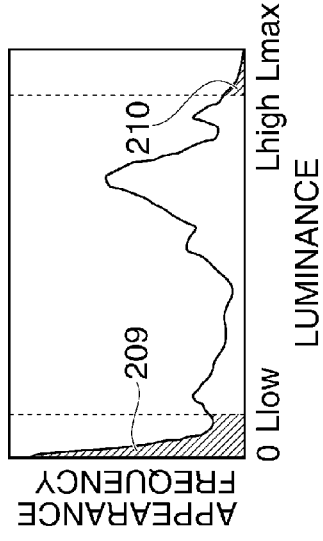
Figure 2C:
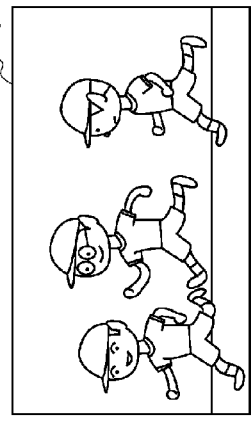

In this example, it is assumed that one frame synthesized image 203 shown in FIG. 2C is obtained from two frames of a bright image 201 shown in FIG. 2A and a dark image 202 shown in FIG. 2B, which have been photographed by changing the exposure in two stages with respect to a reference exposure.

Figure 2F:
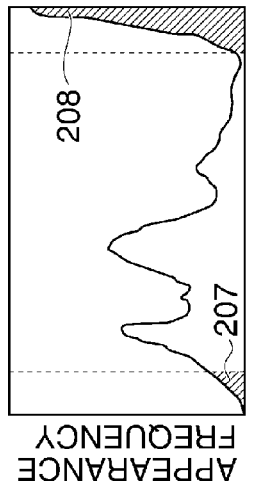
Figure 2G:
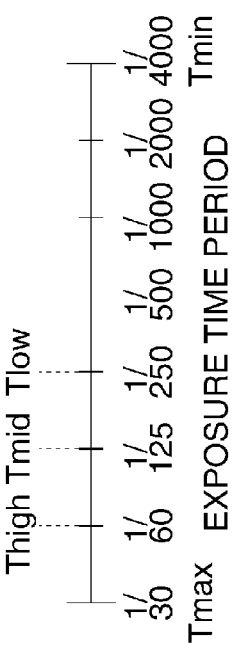

FIG. 2D is a histogram obtained by evaluating the bright image 201 by the luminance acquisition section 105, FIG. 2E is a histogram obtained by evaluating the dark image 202 by the luminance acquisition section 105, and FIG. 2F is a histogram of the synthesized image 203. FIG. 2G is a graph showing the exposure time period of the photographed two frames, in which the exposure time period of the bright image 201 is indicated by Thigh, and that of the dark image 202 is indicated by Tlow with respect to the exposure time period Tmid used as a reference.

If an integrated value of area of a region 207 which is not higher in luminance than a predetermined luminance value Llow is not lower than a predetermined value in the histogram of the bright image 201, shown in FIG. 2D, the control circuit 111 judges that blocked-up shadows are generated when this image is subjected to the HDR process. In this case, the control circuit 111 sets the exposure time period of a bright image to be photographed next such that it is made longer by one step.

Here, the term "one step" is a predetermined time period corresponding to an increment/decrement of the exposure time period, which is smaller than one Tv (time value) corresponding to an interval between marks in FIG. 2G.

On the other hand, when it is determined that blocked-up shadows are not generated, if an integrated value of area of an region 208 which is not lower in luminance than a predetermined luminance value Lhigh is not lower than a predetermined value, the control circuit 111 judges that the exposure time period is longer than necessary, and sets the exposure time period of a bright image to be photographed next such that it becomes closer to the reference exposure time period by one step. Note that when there is no difference from the reference exposure time period, the control circuit 111 holds the exposure time period.

Similarly, when an integrated value of area of an region 210 which is not lower in luminance than the predetermined luminance value Lhigh is not lower than the predetermined value in the histogram of the dark image 202 shown in FIG. 2E, the control circuit 111 judges that blown-out highlights are generated when this image is subjected to the HDR process. In this case, the control circuit 111 sets the exposure time period of a dark image to be photographed next such that it becomes shorter by one step.

On the other hand, when it is determined that blown-out highlights are not generated, if an integrated value of area of a region 209 which is not higher in luminance than the predetermined luminance value Llow is not lower than the predetermined value, the control circuit 111 judges that the exposure time period is shorter than necessary, and sets the exposure time period of a dark image to be photographed next such that it becomes closer to the reference exposure time period by one step. Note that when there is no difference from the reference exposure time period, the control circuit 111 holds the exposure time period.

Next, a description will be given of image pickup of a multistage exposure image group, and an example of detection of amounts of motion during exposure for the multistage exposure image group, with reference to a timing diagram shown in FIG. 3.

Figure 3:
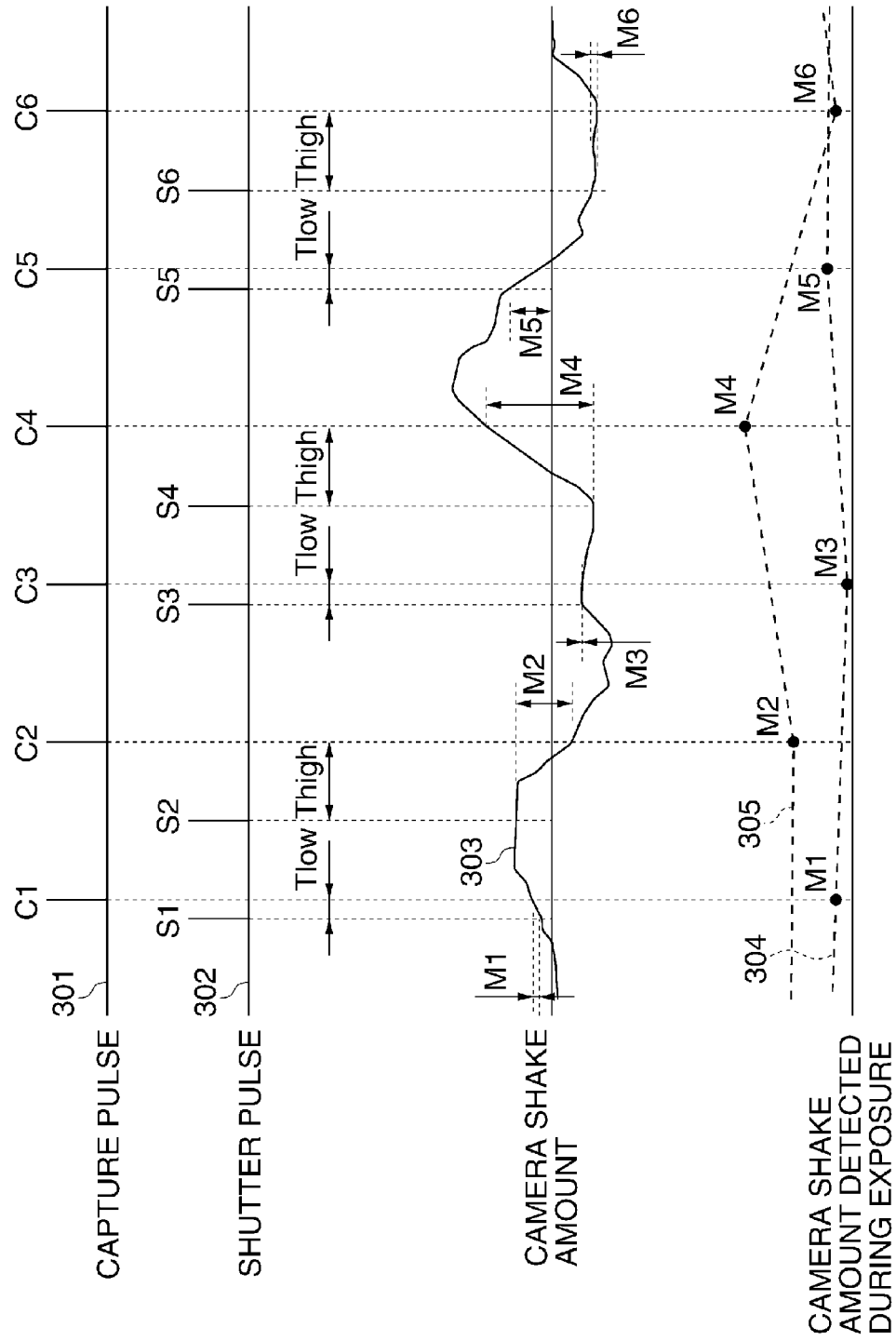
FIG. 3 is a timing diagram useful in explaining image pickup of a multistage exposure image group, and an example of detection of amounts of motion during exposure for the multistage exposure image group.

In FIG. 3, a capture pulse signal 301 is a signal used as a trigger for the image pickup unit 103 to start capturing an image from the image pickup device. Further, a shutter pulse signal 302 is a signal for determining an exposure time period of the image pickup device.

For example, a first frame is exposed during a time period Tlow between a shutter pulse S1 and a capture pulse C1, and captures a dark image. A second frame is exposed during a time period Thigh between a shutter pulse S2 and a capture pulse C2, and captures a bright image. Similarly, third, fourth, fifth, and sixth frames sequentially capture a dark image, a bright image, a dark image, and a bright image, respectively.

In FIG. 3, a camera shake amount 303 is an amount of motion of the camera main unit 100, continuously detected by the motion detecting section 110 in parallel with the above-mentioned photographing.

The amount of motion of the camera main unit 100 is detected at a sampling rate of e.g. 1.2 kHz with respect to a photographing frame rate of 60 Hz, and the control circuit 111 interpolates detected amounts of motion to thereby use them as amounts of change in continuous motion. As shown in FIG. 3, a camera shake amount M1 is detected during exposure for the dark image of the first frame, and a camera shake amount M2 is detected during exposure for the bright image of the second frame. Similarly, camera shake amounts M3 to M6 are detected during exposure for the third to sixth frames, respectively.

In FIG. 3, for the camera shake amount detected during exposure, a broken line 304 indicates changes in camera shake amount of the dark image, and a broken line 305 indicates changes in camera shake amount of the bright image. Since the bright image is longer in exposure time period than the dark image, the camera shake amount detected during exposure for the bright image tends to be larger.

Next, a description will be given of a criterion for determining whether or not a focus evaluation value acquired from a photographed frame is to be used for the focus control, with reference to FIG. 4.

Figure 4:
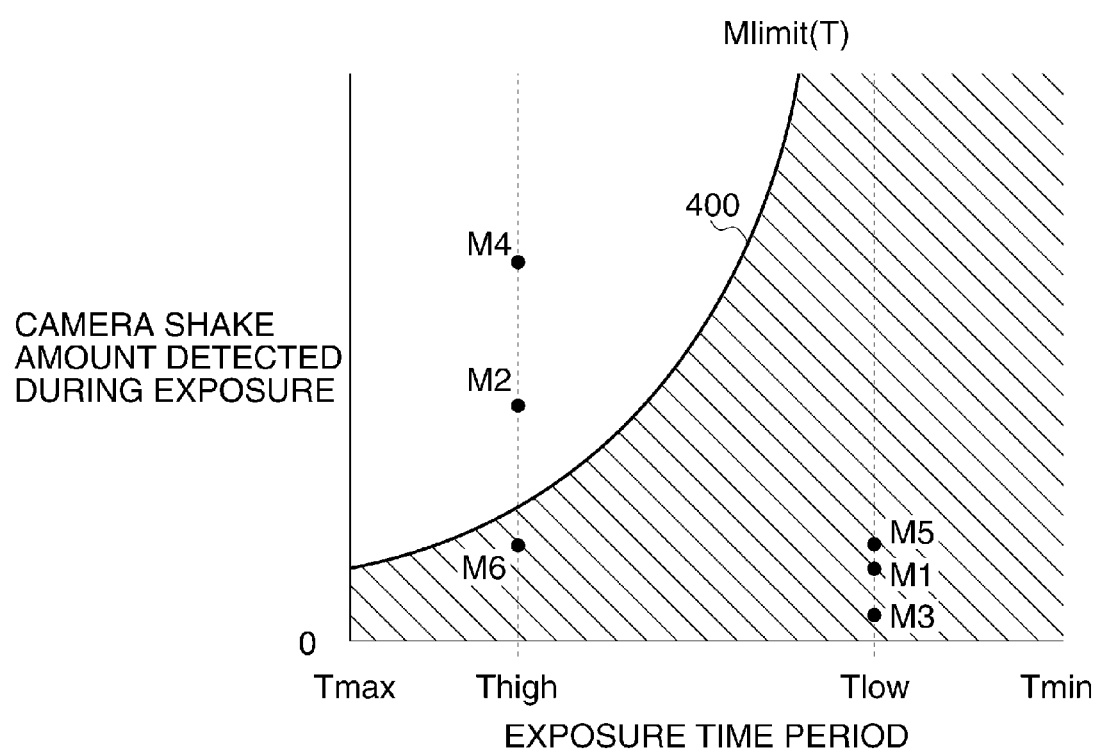
FIG. 4 is a graph showing the relationship between an exposure time period and a camera shake amount during exposure, found with respect to photographed images of first to sixth frames appearing in FIG. 3.

FIG. 4 is a graph showing the relationship between an exposure time period and a camera shake amount during exposure, found with respect to photographed images of first to sixth frames appearing in FIG. 3. As shown in FIG. 4, for the dark images of the first, third, and fifth frames, the camera shake amounts M1, M3, and M5 detected during exposure over the exposure time period Tlow are indicated. Further, for the bright images of the second, fourth, and sixth frames, the camera shake amounts M2, M4, and M6 detected during exposure over the exposure time period Thigh.

In FIG. 4, a curve 400 indicates changes in a reference value for use in determining whether or not the control circuit 111 is to use a focus evaluation value obtained from a photographed image by the focus evaluation value acquisition section 106, for the focus control.

The reference value is expressed by a function Mlimit(T) with respect to the exposure time period T, and the control circuit 111 uses only focus evaluation values obtained from the frames indicated below the reference value, for the focus control. However, focus evaluation values acquired from frames which are the shortest in exposure time period in the multistage exposure image group used for image synthesis are always used for the focus control (in the illustrated example, the first, third, and fifth frames are all below the reference value).

The reference value function Mlimit(T) is set in such a manner that the focus evaluation value is to be used for the focus control irrespective of the camera shake amount detected during exposure in a case where the exposure time period T is sufficiently short, and is to be used for the focus evaluation only when the camera shake amount detected during exposure is small in a case where the exposure time period T is long. This is because when the exposure time period is long, the degree of sharpness of a photographed object image is reduced due to the influence of camera shake, and hence it is not possible to perform the focus control with accuracy. For example, by dividing the exposure time period T into three regions or so, the reference value function can be set as a quadratic function of the exposure time period T for each region.

By using the criterion for determination described as above, many frames are used for the focus evaluation within a range in which the accuracy of the focus evaluation value can be expected at least to a certain degree to thereby increase the sampling rate, which makes it possible to increase the speed of operation for focusing the camera on an object. Further, when the camera main unit 100 is moving, the speed of the focusing operation is reduced due to a decrease in the number of frames used for the focus evaluation. However, when the camera main unit 100 stops, it is possible to speedily focus the camera on the object.

Figure 5:
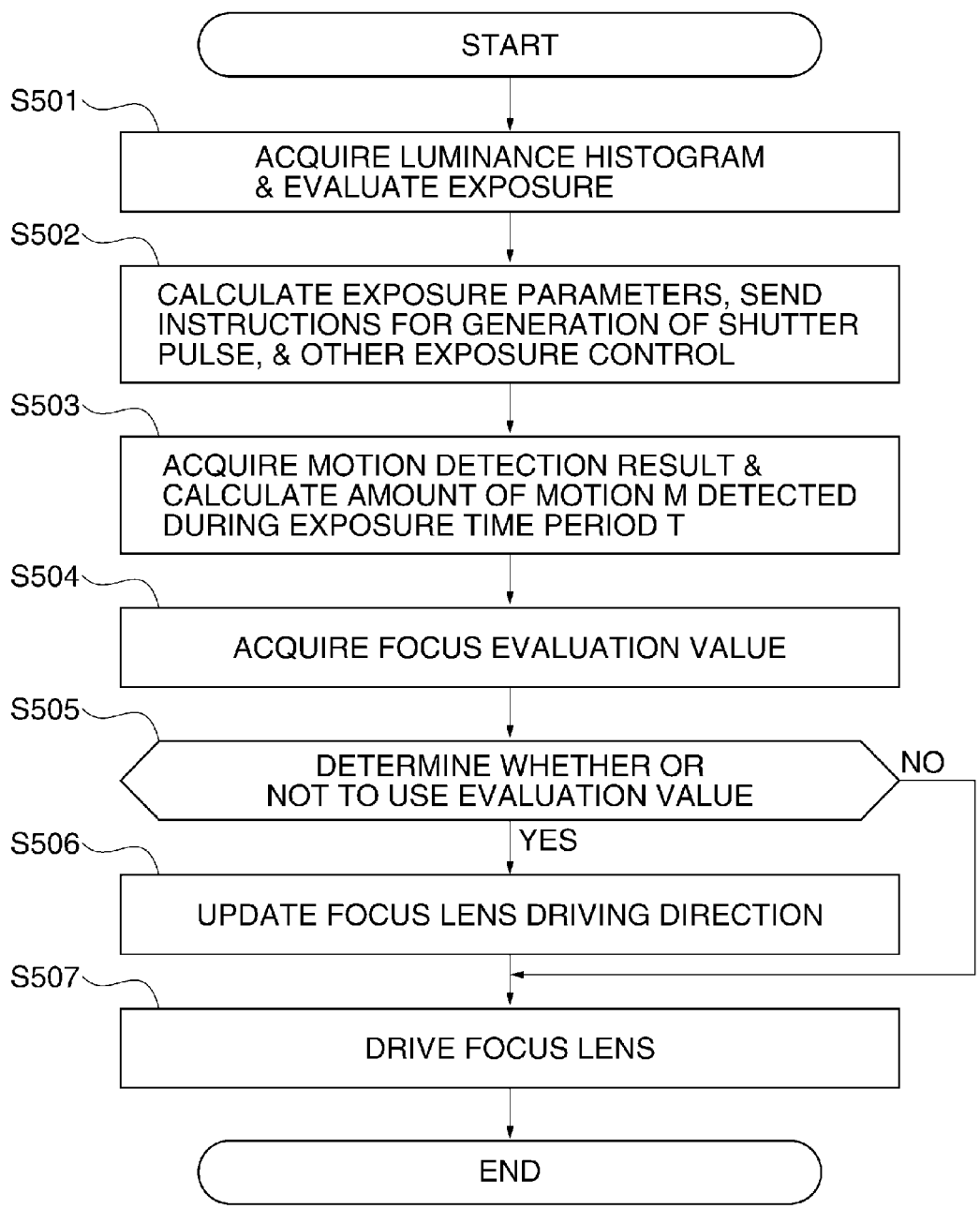
FIG. 5 is a flowchart of an auto focus control process executed by a control circuit for each one frame photographing.

Next, a description will be given of an auto focus control process executed by the control circuit 111 whenever one frame is photographed with reference to FIG. 5. The auto focus control process in FIG. 5 is executed e.g. by a CPU of the control circuit 111 by loading a program stored e.g. in the ROM into the RAM.

In a step S501, the control circuit 111 acquires the histogram of the luminance of a photographed frame from the luminance acquisition section 105, performs exposure evaluation, and then proceeds to a step S502.

In the step S502, the control circuit 111 calculates exposure parameters for use in making the exposure closer to appropriate exposure, such as the exposure time period, the aperture, the gain, and the ND filter. Further, as described with reference to FIGS. 2A to 2G, the control circuit 111 adjusts the exposure time period for multistage exposure so as to prevent blocked-up shadows and blown-out highlights from being generated after execution of the HDR process, and sends instructions for the timing of generating a shutter pulse for a frame to be exposed next to the image pickup unit 103. Further, the control circuit 111 sends instructions for the other parameters, such as the aperture, the gain, and the ND filter, to the lens barrel 101 and the image pickup unit 103, and then proceeds to a step S503.

In the step S503, the control circuit 111 acquires the detected amount of motion of the camera main unit 100 for one frame from the motion detecting section 110, and calculates the motion amount M during the exposure time period T of the photographed frame as described with reference to FIG. 3, and then proceeds to a step S504.

In the step S504, the control circuit 111 acquires the focus evaluation value F on the photographed frame from the focus evaluation value acquisition section 106, and then proceeds to a step S505.

In the step S505, as described with reference to FIG. 4, the control circuit 111, determines, based on the acquired exposure time period T and the motion amount M, whether or not to use the focus evaluation value for the focus control, and if the focus evaluation value is to be used for the focus control, the control circuit 111 proceeds to a step S506, whereas if not, the control circuit 111 proceeds to a step S507.

In the step S506, the control circuit 111 updates a direction of driving the focus lens 102 based on a comparison between the immediately preceding focus evaluation value determined to be used and the current focus evaluation value determined to be used, and then proceeds to the step S507.

In the HDR moving image-photographing mode, it is expected that the focus evaluation value is compared between images which are different in exposure time period, and hence each focus evaluation value is normalized by brightness to thereby perform the comparison. The brightness taken into consideration in normalization may be an exposure time period or may be a luminance of an image, which is actually obtained. On the other hand, in the normal moving image-photographing mode, images sequentially photographed and obtained undergo smooth change in brightness in most cases, and hence it is possible to perform the comparison basically without performing normalization.

In the step S507, the control circuit 111 instructs the lens driving unit 120 of the lens barrel 101 to drive the focus lens 102, and terminates the present process.

As described above, in the present embodiment, when a moving image is photographed by periodically changing the exposure time period, it is possible to perform appropriate AF control according to the condition of the object.

Although in the present embodiment, the case where image are photographed by changing the exposure time period in two stages has been described by way of example, images may be photographed by changing the exposure time period in three or more stages. Further, although in the present embodiment, whether or not to use the focus evaluation value for the focus control is determined based on the exposure time period and the amount of motion of the camera main unit 100, it is also possible to obtain the same advantageous effects by determining whether or not to use the focus evaluation value based on the exposure time period or the amount of motion of the camera main unit 100.

Further, although in the present embodiment, as the evaluation value of an image, the focus evaluation value is used, this is not limiting, but a luminance evaluation value of an image for the AE control, an evaluation value for tracking an object, or the like may be used.

Next, a description will be given of a digital camera as an image pickup apparatus according to a second embodiment of the present invention with reference to FIG. 6. The present embodiment is distinguished from the first embodiment only in the criterion for determining whether or not to use the focus evaluation value acquired from an image for the focus control. Therefore, the same component elements as those of the first embodiment are denoted by the same reference numerals, and only different points will be described.

In the above-described first embodiment, focus evaluation values acquired from frames shortest in exposure time period in the multistage exposure image group are always used for the focus control irrespective of the camera shake amount detected during exposure over the exposure time period. In contrast, in the present embodiment, focus evaluation values acquired from frames smallest in the amount of motion detected over the exposure time period in the multistage exposure image group are used for the focus control.

Figure 6:
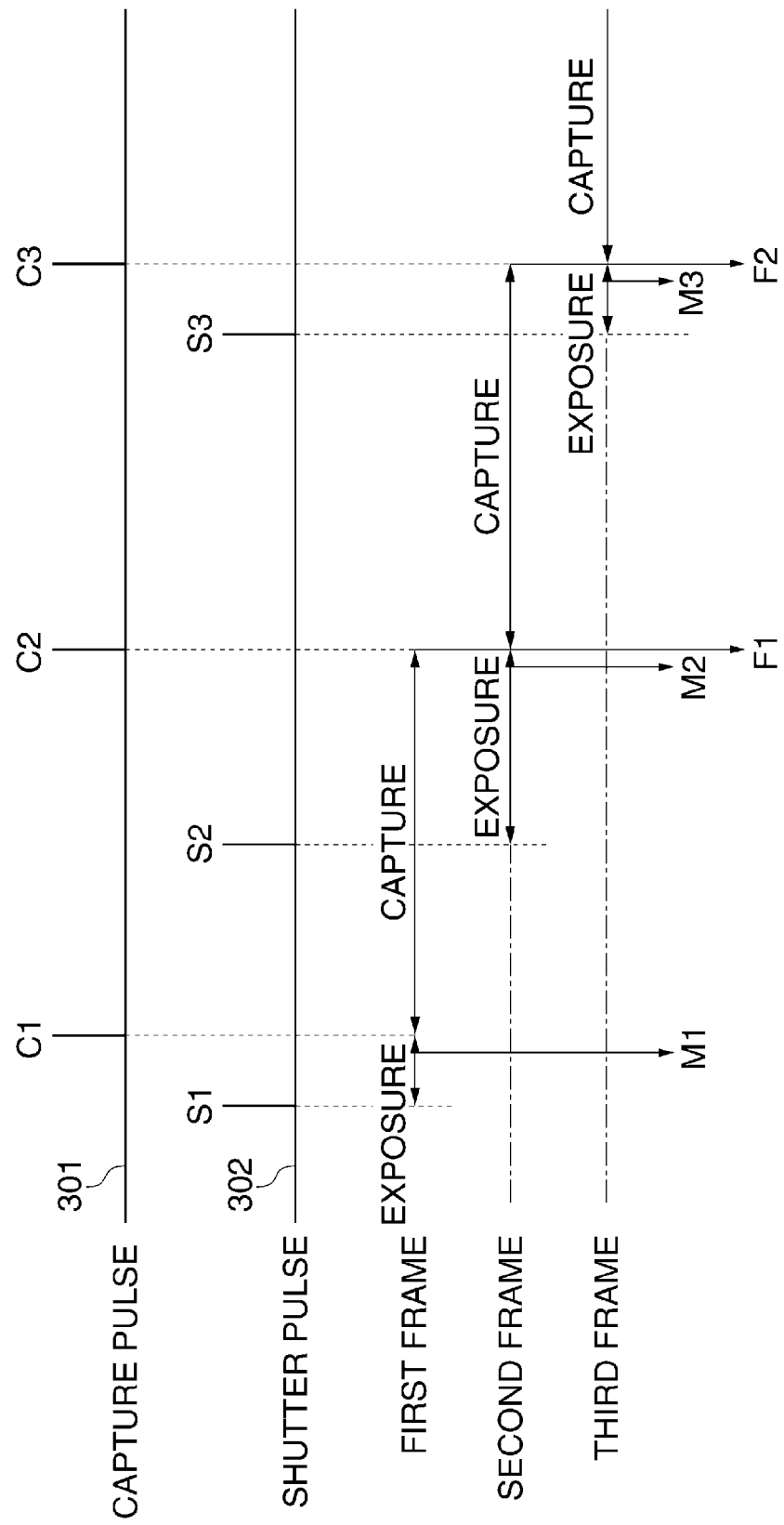
FIG. 6 is a timing diagram showing timing of processing for exposure for each image to be photographed by an image pickup device and processing for capturing the photographed image from the image pickup device, which are executed by a digital camera as an image pickup apparatus according to a second embodiment of the present invention.

FIG. 6 is a timing diagram showing timing of processing for exposure for each image to be photographed by an image pickup device and processing for capturing the photographed image from the image pickup device. The timing of acquiring the amount of motion detected during exposure for each frame to be photographed and acquiring the focus evaluation value by the control circuit 111 will be described. Note that as described hereinabove, the control circuit 111 acquires an amount of motion detected during exposure for each frame and an associated focus evaluation value from the motion detecting section 110 and the focus evaluation value acquisition section 106, respectively.

In FIG. 6, the first frame is exposed during a time period between the shutter pulse S1 and the capture pulse C1 (strictly, shortly before this), and the amount of motion M1 during the exposure is acquired before the exposure is terminated. Further, the first frame is captured during a time period between the capture pulses C1 and C2, and the focus evaluation value F1 is acquired before the completion of the capture. Note that in the present embodiment, differently from the first embodiment, the amounts of motion during exposure (including M1 to M6) are each detected by the motion detecting section 110 before termination of exposure.

Similarly, the second frame is exposed during a time period between the shutter pulse S2 and the capture pulse C2 (strictly, shortly before this), and the amount of motion M2 during the exposure is acquired before the exposure is terminated.

That is, before the focus evaluation value F1 of the first frame is acquired, not only the amount of motion M1 of the first frame, but also the amount of motion M2 of the second frame to be captured next can be detected. Therefore, when the multistage exposure image group is obtained by performing exposure in two stages, the control circuit 111 can determine, after detecting the camera shake amounts of the both, which of the focus evaluation values is to be used, during capturing of the first frame photographed precedingly.

By using the criterion for determination described as above, when photographing is performed by periodically changing the exposure time period, even if a situation occurs in which a frame longer in exposure time period is relatively smaller in camera shake amount, it is possible to perform the focus control with accuracy. The configuration other than this is the same as that according to the first embodiment.

Next, a description will be given of a digital camera as an image pickup apparatus according to a third embodiment of the present invention with reference to FIGS. 7 and 8. The present embodiment is distinguished from the above-described first embodiment only in the reference value function used for determining whether or not to use a focus evaluation value acquired from an image, for the focus control. Therefore, the same component elements as those of the first embodiment are denoted by the same reference numerals, and only different points will be described.

First, focus control based on a hill climbing method in contrast detection focus control, based on which photographing is performed in the third embodiment, will be described with reference to FIG. 7.

Figure 7:
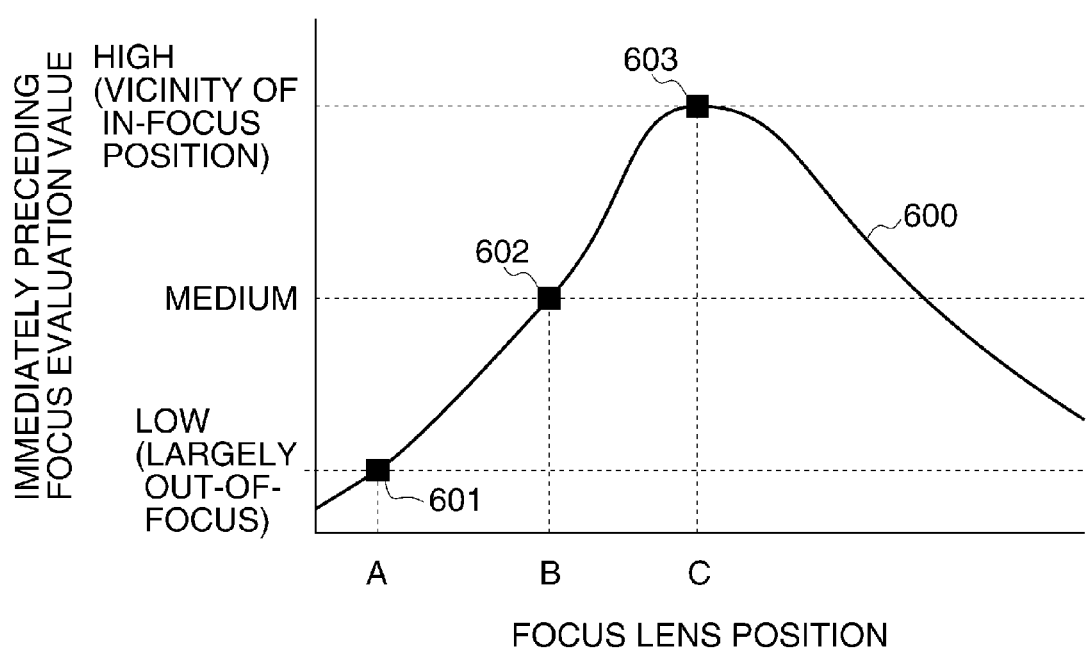
FIG. 7 is a graph useful in explaining focus control based on a hill climbing method in contrast detection focus control, based on which photographing is performed by a digital camera as an image pickup apparatus according to a third embodiment of the present invention.
Figure 8:
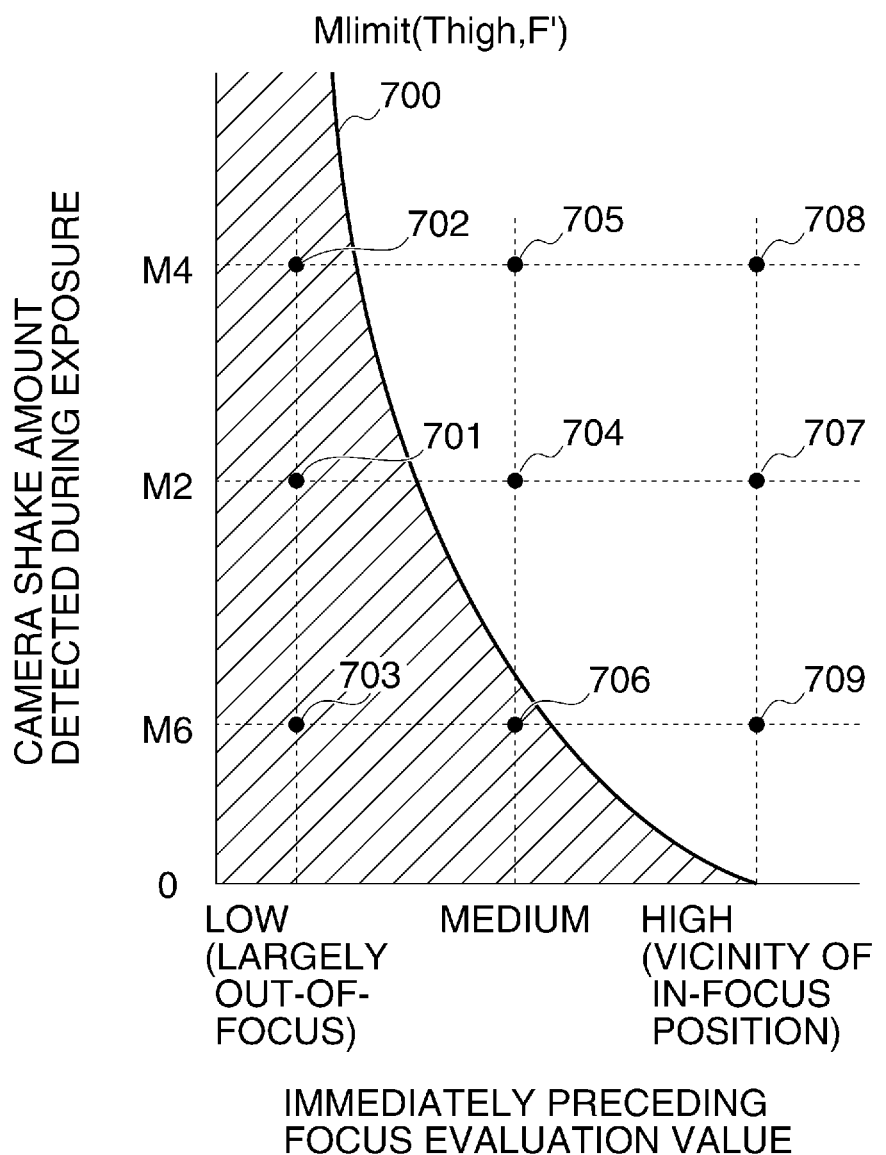
FIG. 8 is a graph showing the relationship between a camera shake amount detected during exposure and a focus evaluation value immediately before processing a frame.

In FIG. 7, a characteristic curve 600 indicates focus evaluation values associated with respective positions of the focus lens 102 on the optical axis. The control circuit 111 instructs the lens driving unit 120 of the lens barrel 101 to perform minute-driving of the focus lens 102.

Then, the control circuit 111 acquires a focus evaluation value from the focus evaluation value acquisition section 106 to thereby determine whether the object is in focus or out of focus, and if the object is out of focus, the control circuit 111 determines on which side of the present position the focus position of the focus lens 102 exists.

When the focus evaluation value is low, the control circuit 111 causes the lens driving unit 120 to drive the focus lens 102 in a direction in which the focus evaluation value becomes higher at a speed as high as possible, reduce the speed as the focus evaluation value becomes higher, and finally accurately stop the focus lens 102 at a position corresponding to a top (value indicative of the in-focus state) of the curve of the focus evaluation value.

For example, when a still object is photographed, if the focus evaluation value associated with a position A of the focus lens 102 is in a state denoted by reference numeral 601, in which the object is largely out of focus, the control circuit 111 determines by minute-driving that the focus position exists on a right side of the present position (A) as viewed in FIG. 7.

Then, the control circuit 111 drives the focus lens 102 at high speed, thereby passing a position B corresponding to a state denoted by reference numeral 602, and reduces the speed as the focus position comes closer to the focus position C corresponding to a state denoted by reference numeral 603, whereby the object is finally brought into focus.

By the way, when the camera main unit 100 is moving, an image blur dependent on the exposure time period is caused even if the object remains still, so that the edges of the object image are blurred, which lowers the focus evaluation value. Inversely, even when the camera main unit 100 remains still, if the object is moving, the focus evaluation value is similarly lowered.

The digital camera according to the present embodiment performs photographing by periodically changing the exposure time period for the HDR process, and hence the focus evaluation value is varied in a manner dependent on the exposure time period. To comply with this, when the focus lens 102 is in the vicinity of the focus position where the accuracy of the position thereof is required, only focus evaluation values acquired from frames which are short in exposure time period and small in camera shake amount detected during exposure are used for the focus control.

On the other hand, in the out-of-focus state in which high-speed driving of the focus lens 102 is required rather than the accuracy of the position thereof, changes in exposure time period and camera shake amount detected during exposure are tolerated, and the reference value function is set such that focus evaluation values from as many frames as possible can be used for the focus control.

The reference value function used in the present embodiment will be described with reference to FIG. 8. FIG. 8 is a graph showing the relationship between the camera shake amount detected during exposure and the focus evaluation value immediately before processing a frame. In FIG. 8, camera shake amounts obtained when the object is largely out of focus because the immediately preceding focus evaluation values are low, are indicated by reference numerals 701, 702, and 703 in association with the camera shake amounts during exposure M2, M4, and M6 for the second, fourth, and six frames, each having the bright image, out of the photographed images of the first to sixth frames shown in FIG. 3.

On the other hand, the curve 700 indicates changes in the reference value with reference to which whether or not a focus evaluation value is to be used for the focus control is determined by the control circuit 111. This reference value is expressed by a function Mlimit(T, F') with respect to the exposure time period T and the immediately preceding focus evaluation value F', and the control circuit 111 uses only focus evaluation values obtained from frames indicated below the curve 700, for the focus control.

In this example, the exposure time period of the second, fourth, and sixth frames each having the bright image is expressed by T=Thigh, and hence the curve 700 is expressed by the function Mlimit(Thigh, F'). That is, when the immediately preceding focus evaluation value is in the largely out-of-focus state, all of the focus evaluation values of the second, fourth, and six frames are used for the focus control.

Note that the first, third, and fifth frames each having the dark image, shown in FIG. 3, are the frames which are the shortest in exposure time period in the multistage exposure image group used for image synthesis, and in the present embodiment, these evaluation values are always used for the focus control, and hence the determination based on the camera shake amounts of these frames is not performed.

Similar to the case where the immediately preceding focus evaluation value is in the largely out-of-focus state, when the immediately preceding focus evaluation value is at a medium level, the camera shake amounts M2, M4, and M6 of the second, fourth, and sixth frames are indicated by reference numerals 704, 705, and 706. In this case, only the focus evaluation value acquired from the sixth frame which is below the curve 700 is used for the focus control.

Similarly, when the immediately preceding focus evaluation value is high and hence in the vicinity of the in-focus state, the camera shake amounts M2, M4, and M6 of the second, fourth, and sixth frames are indicated by reference numerals 707, 708, and 709, and no camera shake amount is below the curve 700. Therefore, none of the focus evaluation values are used for the focus control.

By using the criterion for determination described as above, when photographing is performed by periodically changing the exposure time period, it is possible to perform the focusing operation from the out-of-focus state at high speed, and perform the focusing operation with accuracy in the vicinity of the in-focus position. The configuration other than this is the same as that according to the first embodiment.

Further, although in the present embodiment, the description has been given of the example in which the image pickup unit 103 continuously performs photographing by periodically changing the exposure time period to thereby obtain the multistage exposure image group, this is not limiting, but the present embodiment can be applied to a case where the image pickup unit 103 changes the exposure time period for each predetermined line of one image pickup device to thereby obtain a multistage exposure image group by one photographing operation.

While the present invention has been described with reference to embodiments, it is to be understood that the invention is not limited to the disclosed embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2012-196076, filed Sep. 6, 2012, which is hereby incorporated by reference herein in its entirety.

What is claimed is:

1. An image pickup apparatus comprising:
an image pickup unit configured to pick up images of a multistage exposure image group by periodically changing an exposure time period;
a motion detecting unit configured to detect an amount of motion of said image pickup unit during each exposure time period;
an evaluation value acquisition unit configured to acquire a focus evaluation value from each of images output from said image pickup unit;
a driving unit configured to drive a focus lens in a direction of an optical axis; and
a control unit configured to control a focus state of an object whose image is to be picked up, by causing said driving unit to, in a first case, move the focus lens according to the focus evaluation value acquired from one of the images which is the shortest in exposure time period among the multistage exposure image group, and by causing said driving unit to, in a second case, move the focus lens according to the focus evaluation value acquired from another of the images, which is longer in exposure time period than the one of the images, among the multistage exposure image group and for which the detected amount of motion is smaller than a reference value.

2. The image pickup apparatus according to the claim 1, wherein the reference value is expressed by a function Mlimit(T) with respect to the exposure time period T.

3. The image pickup apparatus according to the claim 1, further comprising a synthesis unit configured to synthesize the multistage exposure image group to thereby generate a high dynamic range image having a wide dynamic range.

4. The image pickup apparatus according to the claim 1, wherein, in the first case, the control unit causes said driving unit to move the focus lens according to the focus evaluation value acquired from the one of the images which is the shortest in exposure time period among the multistage exposure image group irrespective of the detected amount of motion during the corresponding exposure time period.

5. The image pickup apparatus according to the claim 1, wherein the control unit is further configured to control the focus state of the object whose image is to be picked up by not causing said driving unit to move the focus lens according to the focus evaluation value in a third case where the focus evaluation value is acquired from the another of the images, which is longer in exposure time period than the one of the images, among the multistage exposure image group and for which the detected amount of motion is greater than the reference value.

6. A method comprising:
picking up, by an image pickup unit, images of a multistage exposure image group by periodically changing an exposure time period;
detecting an amount of motion of said image pickup unit during each exposure time period;
acquiring a focus evaluation value from each of images output from said image pickup unit; and controlling a focus state of an object whose image is to be picked up, by, in a first case, moving a focus lens in a direction of an optical axis according to the focus evaluation value acquired from one of the images which is the shortest in exposure time period among the multistage exposure image group, and by, in a second case, moving the focus lens in the direction of the optical axis according to the focus evaluation value acquired from another of the images, which is longer in exposure time period than the one of the images, among the multistage exposure image group and for which the detected amount of motion is smaller than a reference value.

7. The method according to the claim 6, wherein, in the first case, the focus lens is moved according to the focus evaluation value acquired from the one of the images which is the shortest in exposure time period among the multistage exposure image group irrespective of the detected amount of motion during the corresponding exposure time period.

8. The method according to the claim 6, further comprising controlling the focus state of the object whose image is to be picked up by not moving the focus lens according to the focus evaluation value in a third case where the focus evaluation value is acquired from the another of the images, which is longer in exposure time period than the one of the images, among the multistage exposure image group and for which the detected amount of motion is greater than the reference value.

* * * * *